May 12, 1931.  B. M. SHIPLEY  1,804,650
CASH REGISTER
Filed March 15, 1928   7 Sheets-Sheet 1

Inventor
Bernis M. Shipley
By
His Attorneys

May 12, 1931.  B. M. SHIPLEY  1,804,650
CASH REGISTER
Filed March 15, 1928  7 Sheets-Sheet 2
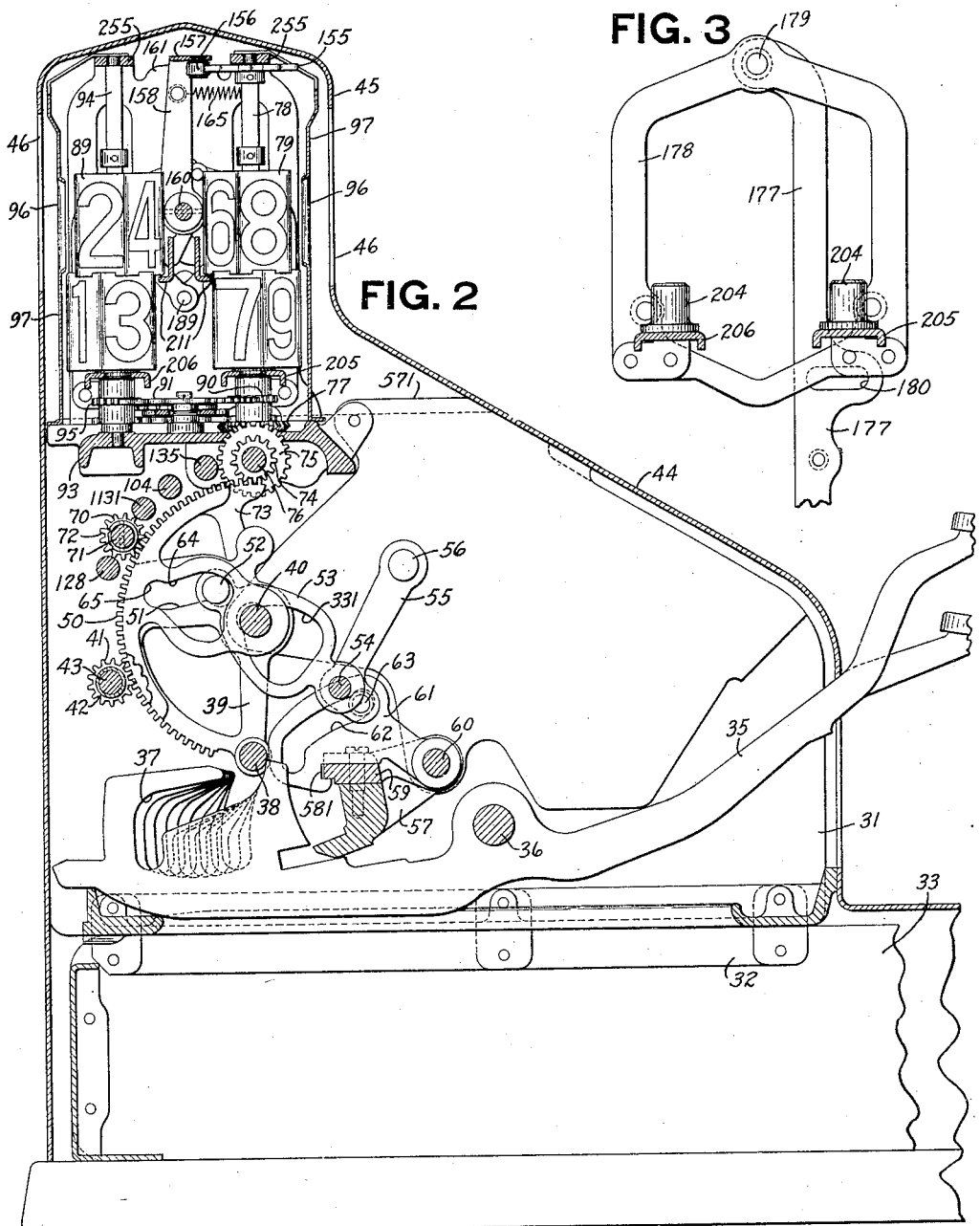
Inventor
Bernis M. Shipley
By
Earl Beust
Ralph S. Warfield.
His Attorneys May 12, 1931.  B. M. SHIPLEY  1,804,650
CASH REGISTER
Filed March 15, 1928  7 Sheets-Sheet 3
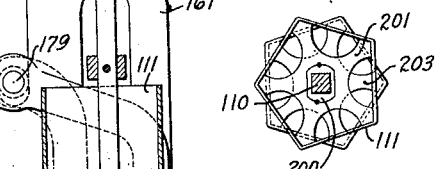
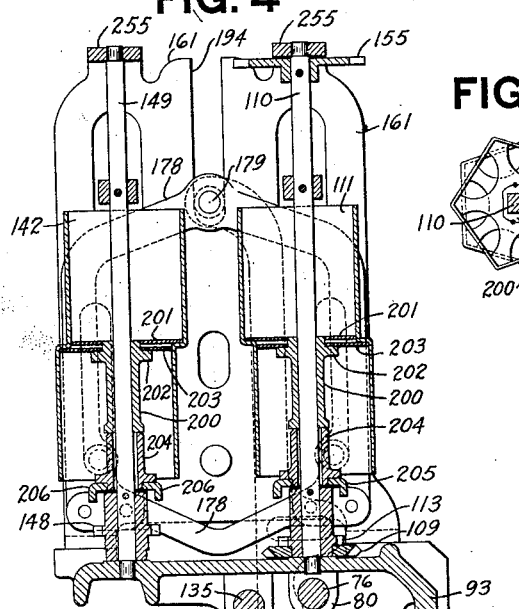
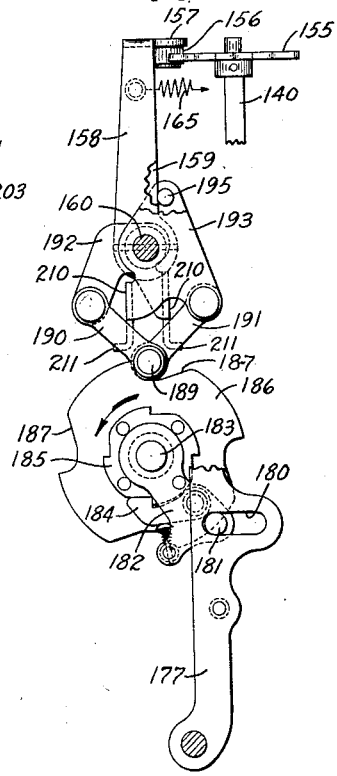
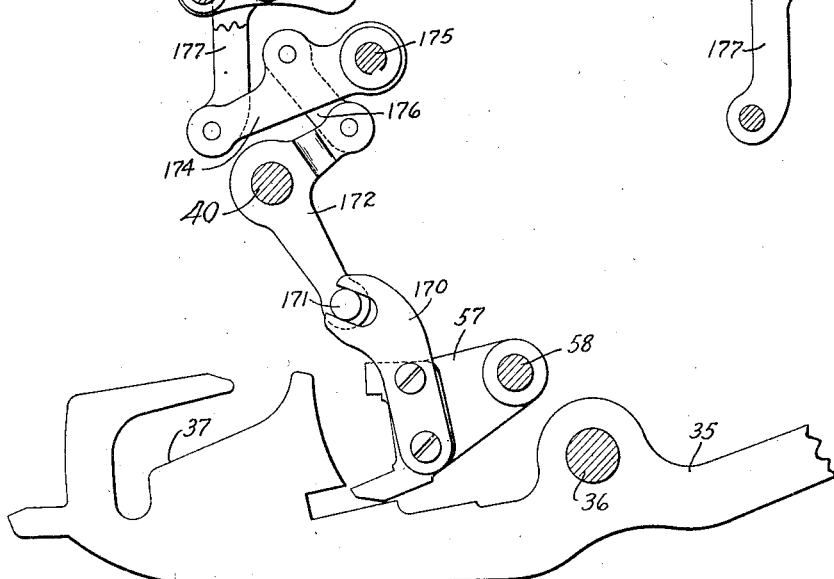
Inventor
Bernis M. Shipley
By Earl Beust
Ralph S. Warfield
His Attorneys May 12, 1931.  B. M. SHIPLEY  1,804,650

CASH REGISTER

Filed March 15, 1928   7 Sheets-Sheet 4

Inventor
Bernis M. Shipley
By
His Attorneys

May 12, 1931.  B. M. SHIPLEY  1,804,650
CASH REGISTER
Filed March 15, 1928  7 Sheets-Sheet 5
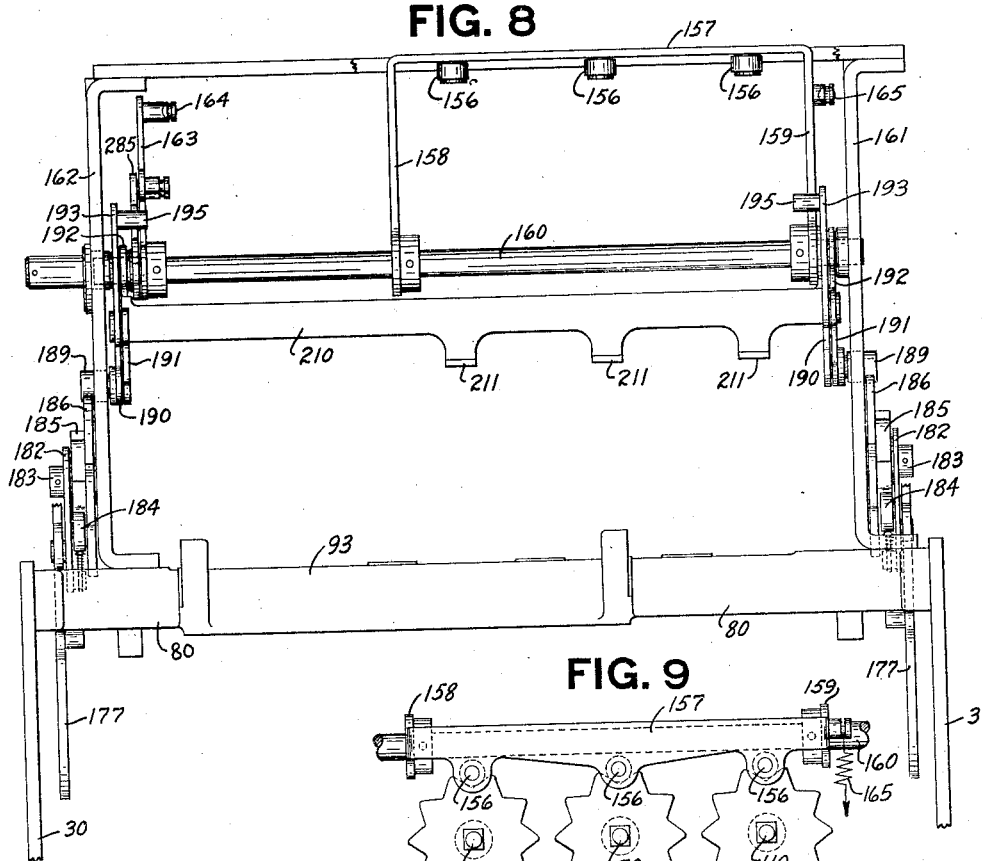
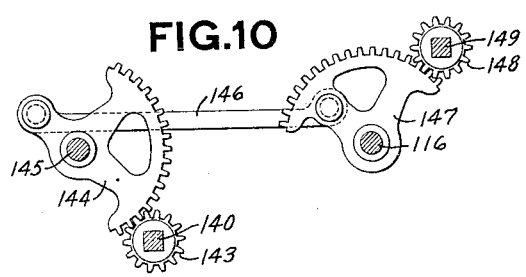
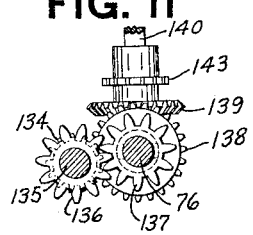
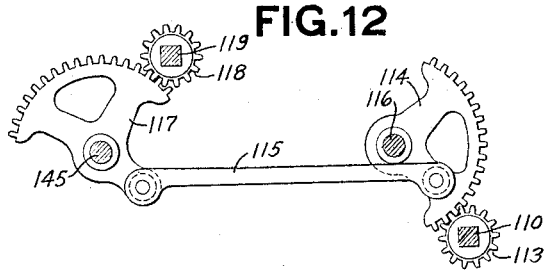
Inventor
Bernis M. Shipley
By Karl Beust
Ralph E. Warfield
His Attorneys May 12, 1931. B. M. SHIPLEY 1,804,650
CASH REGISTER
Filed March 15, 1928 7 Sheets-Sheet 6
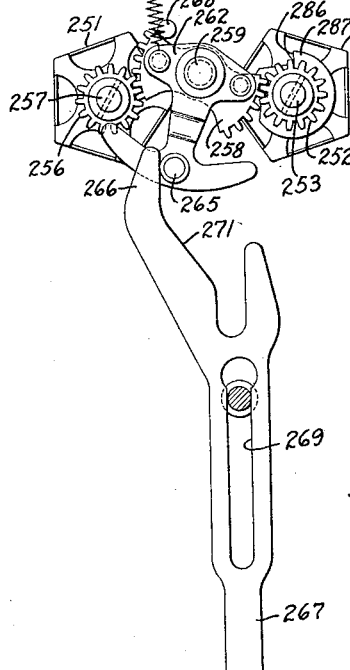
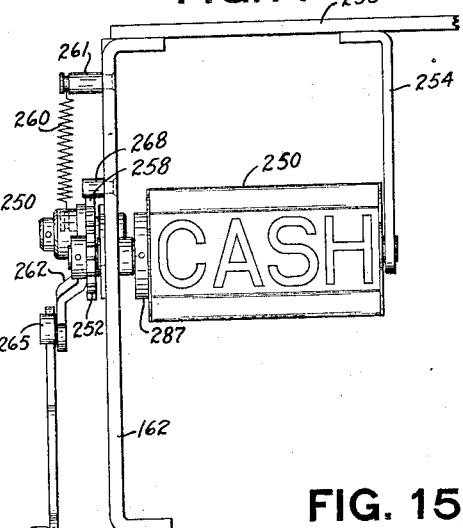
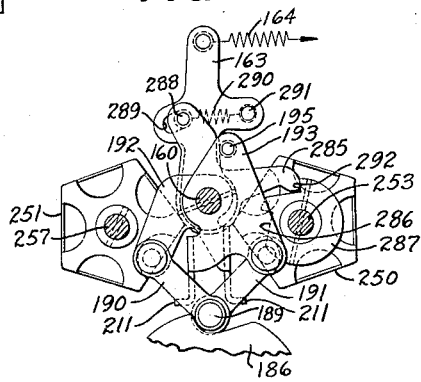
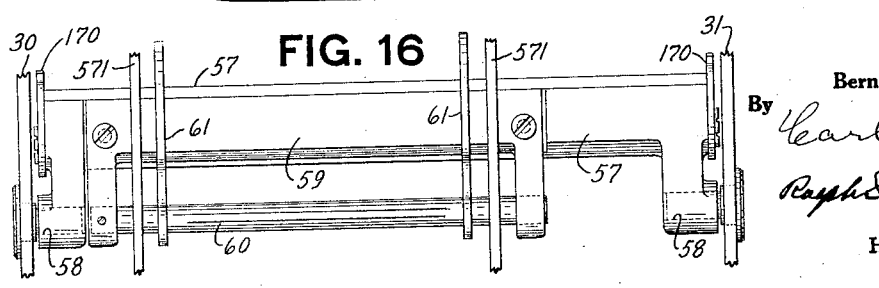
Inventor
Bernis M. Shipley
By
His Attorneys May 12, 1931.    B. M. SHIPLEY    1,804,650
CASH REGISTER
Filed March 15, 1928    7 Sheets-Sheet 7

Inventor
Bernis M. Shipley
By Carl Beust
Ralph S. Warfield
His Attorney

Patented May 12, 1931

1,804,650

UNITED STATES PATENT OFFICE

BERNIS M. SHIPLEY, OF DAYTON, OHIO, ASSIGNOR TO THE NATIONAL CASH REGISTER COMPANY, OF DAYTON, OHIO, A CORPORATION OF MARYLAND

CASH REGISTER

Application filed March 15, 1928. Serial No. 261,996.

This invention relates to improvements in cash registers, and more particularly to indicating mechanisms for cash registers of the type shown and described in Letters Patent of the United States, No. 876,295, issued to T. Carney on January 7, 1908.

One of the objects of the invention is to provide an indicator of small diameter, to occupy a minimum of space in the machine, but with characters of maximum size thereon, so that the characters can be seen from a distance, and to this end, the indicators are each formed of two polygonous members arranged in tandem and torsionally offset relatively to each other, each member having a series of characters, the indicators being axially shiftable to display a character of either series.

Another object is to provide a novel means to maintain the indicator in its axially shifted position, said means being adapted to co-operate with the angle of one of the polygonous members of the indicator.

A further object is to torsionally offset the two polygonous members of the indicator, in such a manner, that the angles of one polygon overhang the center of the faces of the other polygon, to provide projections with which cooperates the means for maintaining the indicator in its axially shifted positions.

Still another object of the invention is to so arrange the indicator in relation to the sight opening, that the faces of the polygons, which bear the indicating characters, are close to the opening, to present a flat surface with a maximum angle of vision, whereby the indicator can be seen from a wider range in the place of business in which it is used.

Another object is to provide a cash register with novel indicators which present the amounts set up in proper decimal order to the eye from both front and rear, thus providing an indicator which can be read at a glance.

A further object is the provision of indicating mechanism for key-operated machines, which will impose the minimum amount of load on the keys for its operation.

A still further object is the provision of novel and simple, yet very rapid and effective, means for adjusting the indicators to correspond with the keys depressed.

Still another object is the provision of novel means to prevent over-running or overthrow of the indicators when being set to their indicating positions, and to hold them where set or adjusted.

Another object is the provision of novel means to control the aligning mechanism for the indicators.

A further object is the provision of novel transaction indicating means.

Still another object is the provision in a key-actuated machine, of a novel form of indicating mechanism, whereon the digits of the amount registered on the machine will appear on both front and rear of the machine in their natural order.

With these and incidental objects in view, the invention consists of certain novel features of construction and combinations of parts, the essential elements of which are set forth in appended claims and a preferred form or embodiment of which is hereinafter described with reference to the drawings which accompany and form a part of this specification.

Of said drawings:

Fig. 2 is a cross sectional view taken through the machine to show the differential mechanism for variously positioning the "tens of cents" indicators.

Fig. 3 is a detail view of one member of the pair of frames for shifting the indicators axially.

Fig. 4 is a detail view, partly in cross section, of the indicator shifting mechanism, and shows the "units of cents" front indicator and the "units of dollars" rear indicator.

Fig. 5 is a detail view of the mechanism for aligning the indicators after they have been rotated, and the means for operating the mechanism for maintaining the indicators in their shifted positions.

Fig. 8 is a detail front view of the indicator aligning means, together with the mechanism for maintaining the indicators in their axially shifted positions shown in Fig. 5.

Fig. 9 is a detail top plan view of the indicator aligning devices.

Fig. 10 is a detail top plan view of the mechanism for transmitting movement from the "units of dollars" front indicator to the "units of dollars" rear indicator.

Fig. 11 is a detail view of the gear mechanism for rotating the "units of dollars" front indicator.

Fig. 12 is a detail top plan view of the mechanism for transmitting movement from the "units of cents" front indicator to the "units of cents" rear indicator.

Fig. 13 is a detail side elevation of the mechanism for adjusting the "Cash" and "No Sale" front and rear indicators.

Fig. 14 is a detail front view of the mechanism shown in Fig. 13.

Fig. 15 is a detail side elevation showing the front and back "Cash" and "No Sale" indicators together with the means for maintaining the amount indicators in their axially shifted positions.

Fig. 16 is a detail plan view of the key coupler and connected parts.

Fig. 19 is a cross-sectional view through one of the indicators.

*General description*

Figure 1:
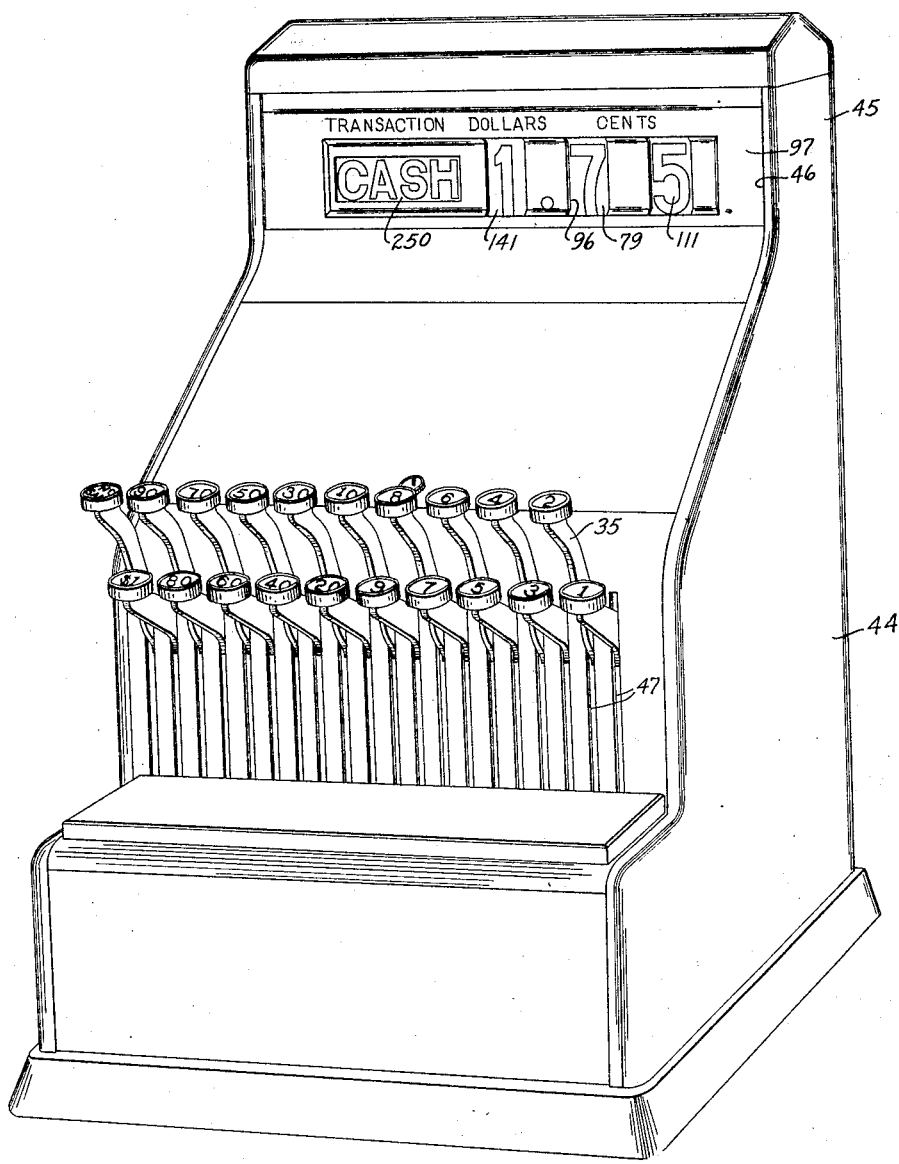
Fig. 1 is a perspective view, showing the type of machine to which the indicator mechanism is applied by way of illustration.

The mechanism disclosed herein includes an illustrative keyboard arrangement, a differential mechanism, indicator mechanism, and a means, known in the art as a "minimum movement" device, for adjusting the indicators directly to the new position, as determined by the value of the depressed keys, without first returning to zero. A somewhat similar mechanism is disclosed in Letters Patent of the United States, No. 1,619,664, issued to F. L. Fuller, et al., on March 1, 1927.

The particular mechanism selected to illustrate one form of the present invention is a key-operated or "press-down" key machine, equipped with two full sets or groups of keys, to register units and tens of cents, and a single "dollar" key.

As in all machines of this type, depression of an amount key controls the indicator mechanism, adds the amount on a totalizer, and effects the imprint of the amount. In the present instance, the invention relates to the indicating mechanism and its control by the keys, therefore the totalizing and printing mechanism have been eliminated.

The indicating mechanism, which is one of the novel features of this invention, includes two groups of rotatable, multiple faced indicating members, one for the front of the machine and the other for the rear, and each indicator of a group is formed of two sections arranged one over the other in tandem, each section having thereon half of the ten digits of the decimal order. In the form shown, the odd digits are placed on the lower section, and the even digits on the upper section of each indicator.

Each indicator is constructed to carry maximum sized characters, but the indicator itself is of a minimum size in diameter, so as to take up very little space in the register. The indicators, furthermore, are arranged to require very little movement when rotating from one position to the other, and this, together with the fact that the indicators are light in weight, reduces the momentum thereof to a minimum.

The size and lightness of weight is obtained by forming the indicators of two sections, each section being pentagonal in shape, thus providing five surfaces on each section for the characters. The complete indicator, comprising two pentagonal sections, which sections, however, are preferably made of one piece of tubing swaged to the shape disclosed, provide ten surfaces for characters, which is sufficient in machines adapted to calculate decimal amounts, for one bank of amount keys running from "zero" to "nine". An indicator of similar shape, that is to say, the shape of the indicator itself, as distinguished from its mode of operation, is disclosed in Letters Patent of the United States, No. 547,888, issued to C. Price on October 15, 1895. However, the indicator disclosed in the patent to Price, differs in many essential particulars from that disclosed herein, the indicators of the patent perform in a different manner. Furthermore, the individual indicators of the patent are adapted for simultaneous indication to the front and back of the machine, as distinguished from this invention wherein separate sets of indicators are provided for the front and back of the machine, respectively. Also, in the Price patent, each indicator is provided with two sets of the same five characters, whereas each complete indicator herein disclosed is provided with one set of ten characters. Other differences will appear hereinafter.

Inasmuch as each indicator has two sections, it is necessary to arrange not only to rotate each indicator to bring the proper charartcers into a plane parallel with the sight openings in the machine, but to shift each indicator axially to bring the characters on the lower section, for example, into visible position at the sight openings. To this end, each indicator is mounted to shift axially along a rotatable shaft, and to rotate therewith. The mechanism is preferably constructed to lift and rotate the indicators simultaneously. Thus, by the time the indicator is rotated to the proper position, it is shifted into position to expose a character on the lower section of the indicator, when such a character is selected by the rotary movement of the shaft. When the character to be exposed is on the upper section of the indicator, the indicator is permitted to drop back to its lower position after it has been shifted. It is to be understood that the invention is not limited to the simultaneous shifting and rotation of the indicators, as it is apparent that the indicators can be first rotated and then shifted, or vice versa. In any event, the final result is the same. However, by operating the two mechanisms simultaneously a saving of time is effected in the operation of the various elements of the machine.

The indicators disclosed are particularly well adapted to machines of the "press-down key" type, as for example, in machines of the type disclosed in Letters Patent of the United States, No. 876,295, issued to Carney on January 7, 1908, and is herein disclosed as shown applied to a machine of a somewhat similar type. But it is not intended to limit the use of this invention to machines of this type, because it can be adapted to any machine wherein indicators are desirable.

In machines of the Carney type, the usual indicators provided in the past, consist of individual tablets, assigned to and operated by the respective keys. One disadvantage of this indicator is that it cannot be readily read, as for example, when registering the amount of one dollar and seventy-five cents ($1.75), the indication reads as follows:

$1.     .70     .05, whereas on the indicator of the present invention, the indication appears in proper form, as shown in Fig. 1 of the drawings. A further disadvantage of the tablet indicator is that when both front and back indicators are desired, the back indicator of the Carney type reads backward. Using the above example, the back indicator reads as follows:

.05     .70     $1.

The indication of the present invention can be read equally well from the front and back of the machine.

By using indicators with ten flat faces instead of a round indicator, the angle of vision in which the indication can be seen is greater. The flat surfaces permit the characters thereon to be brought close up to the sight opening, leaving only enough space between the glass in the sight opening and the indicator to permit free rotation of the indicator. Thus it is apparent that the indicator can be observed from a greater angle than is possible with any of the above enumerated types of indicators. This is a very important feature in indicators for cash registers, since the indicator is intended to be displayed to the customer and to the public, and therefore, by constructing and arranging the indicators in relation to the sight openings, to give a maximum angle of vision, the customer and the public can better observe the amount thereon from all parts of the store.

Detailed description

The mechanism for operating and adjusting the indicators is carried by side frames 30 and 31 (Figs. 2, 6, 7 and 8), supported on a bed plate 32, carried by bolsters 33 (Fig. 2).

A suitable casing or cabinet 44 encloses the framing, the casing having an upward extension to form a cupola or dome 45 to enclose the indicators. Registering openings 46 (Figs. 1 and 2) formed in the front and rear sides of the cupola or dome 45 permit observation of the indicators.

Key board

The forward ends of key levers 35 project through vertical slots 47 formed in the front wall of the casing or cabinet 44. These key levers are arranged in denominational groups from right to left and carry the usual key tops designating the values assigned to the keys.

As disclosed in the present application, the machine is provided with three banks of amount keys. The "units of cents" keys and the "dime" keys are of full complement, that is from "1" to "9" cents and from "10" to "90" cents, respectively. However, in the keyboard disclosed herein only one dollar key has been shown. This keyboard arrangement is illustrative only, as any keyboard arrangement can be used.

Differential mechanism

All of the keys 35 are pivotally mounted on a rod 36 supported in the side frames 30 and 31. The rear ends of each group of keys 35 are differentially slotted, as at 37, to operate the differential mechanism according to the value of the key depressed. Depression of the "1" key moves the differential mechanism one step; the "2" key moves the differential mechanism two steps, and the "9" key moves the differential nine steps.

Figure 17:
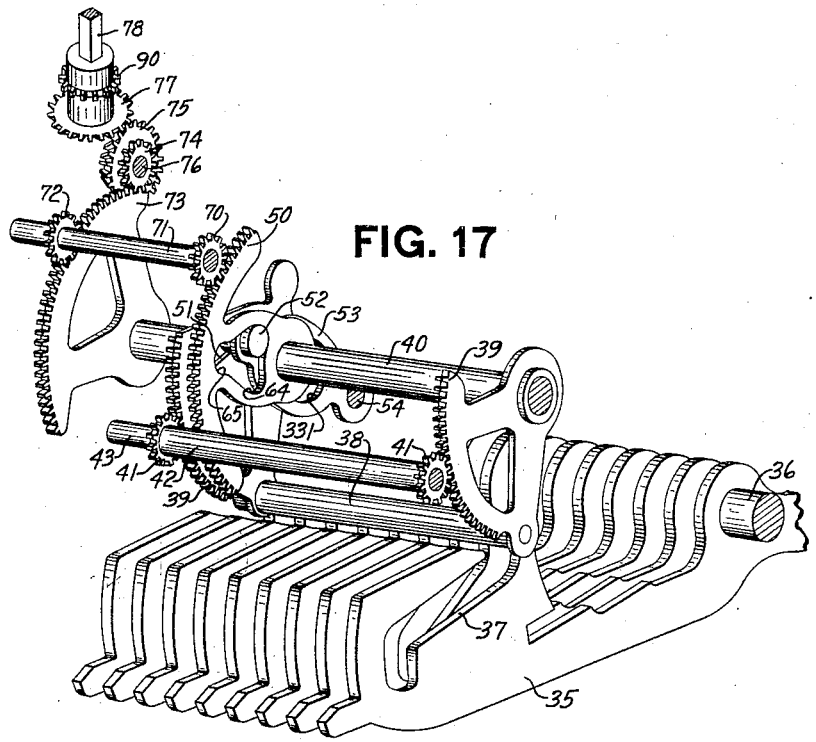
Fig. 17 is a detail perspective view of the differential mechanism for the "dimes" bank of keys.

In the particular machine of this invention, there are slight differences in the mechanism through which the power applied to the key is transmitted to the differential rack, in each denominational group, but such differences being merely expedients, and the "dimes" grouping (Figs. 2 and 17) will be selected as illustrative of one form.

The differential slots 37 (Figs. 2 and 17), are arranged to engage a universal rod 38 carried by and extending between two segments 39 pivoted on a rod 40. The rod 40 is supported in the side frames 30 and 31. A pair of pinions 41, secured to a sleeve 42, loose on a shaft 43 also mounted in the side frames, mesh with the segments 39 to cause them to move uniformly. Thus when a key engages the universal rod 38 at one end thereof, the pinions 41 and sleeves 42 prevent twisting or distortion of the rod 38.

A universal rod 100 (Fig. 7) similar to the rod 38, is provided for the "units of cents" group of keys. The "dollars" banks has no universal rod inasmuch as only one key is disclosed herein; but, in machines in which a full complement of "dollar" keys are used, a similar universal rod 38 is provided. In the present disclosure, other means, hereinafter explained, communicates motion from the dollar key to its differential segment 126.

The differential segments (Figs. 2 and 17), rotate their corresponding indicators to position the selected characters face outward in line with the sight openings, the indicators being axially shifted by other means hereinafter explained, a "minimum movement" device being interposed between each differential and its indicator for adjusting the indicator directly from one position to another without first restoring the indicator to its zero position, as is well known in the art.

The indicators are so located that the indication appears substantially in the center of the machine. The keys 35 in the keyboard are universally spaced across the front of the machine. To adjust the appropriate indicator from each group of keys, it is necessary to so arrange the indicator-setting mechanism that movement will be transmitted from the place where the group of keys are located to the place in which the corresponding indicator is located. For this reason, the transmitting mechanism for each indicator may be structurally different from the other. The "dime" keys and indicators are disclosed in Fig. 2, and the mechanism for adjusting these indicators will be described first.

The effective differential for the "dimes" bank is the right-hand segment 39 (Fig. 2) having a cam slot 51 formed near its upper end. A toothed segment or minimum movement device 50 (Fig. 17), is pivoted on the rod 40 adjacent the effective differential segment 39, and interposed between the differential segment 39 and the toothed segment 50 is a beam actuator 53 loosely mounted on the rod 40. The segment 50 constitutes the minimum movement device, controlled by both the differential segment 39 and the beam actuator 53, the rear end of the beam actuator carrying oppositely projecting studs 52, one of which studs lies in the cam slot 51 in the differential segment 39, and the other stud in a heart-shaped cam opening 64 formed in the toothed segment 50, the studs 52 constituting a sort of connection between the differential segment 39 and the toothed segment 50 to enable the differential segment 39 to control the minimum movement device.

The beam actuator 53 is provided with a heart-shaped cam opening 331 similar to that formed in the toothed segment 50 to encircle the rod 40, the lower end of the beam actuator being pivoted on a rod 54 carried by a pair of radius links 55 pivoted on studs 56 projecting from auxiliary side frames 571, one only being shown.

The rod 54 is common to the beam actuators 53 for the several groups or denominations, and in the present instance, the links 55 are each provided with an offset from which projects a stud 63 entered in cam slots 62 formed in a pair of arms 61 seated in grooves in a bar 59 resting upon and fastened to a key coupler 57 extending over the rear ends of all the groups of keys 35. Trunnions 58 (Figs. 4 and 16) at the ends of the key coupler 57 are journaled in the side frames 30 and 31. The key coupler 57 cooperates with the keys 35 in the usual manner, unnecessary to explain.

The arms 61 are pivoted at their forward ends on a shaft 60 journaled in the auxiliary side frames 571, the rear ends of the arms being hooked over the rear edge 581 of the key coupler.

The minimum movement devices and differentials associated with the "cents" and "dollars" denominational orders will be described later.

The minimum movement device for the dimes bank which is similar to the minimum movement devices for the other denominational orders, operates as follows:

In normal idle position, the differential segments 39 and the beam actuator 53 associated with the dimes group of keys 35 occupy the positions shown in Fig. 2, the apex of the heart-shaped cam opening 331 in the beam actuator 53 fitting around the rod 40, but the toothed segment or minimum movement device 50 occupies the position to which it was last adjusted.

Depression of the key 35 representing the amount to be indicated, rocks the rear end of the key upwardly. The rear end of the depressed key first contacts the key coupler 57 and swings it upwardly together with the cam-slotted arms 61, thereby rocking the links 55 and rod 54 clockwise to thrust the beam actuator 53 in the direction of its length. This disengages the apex of the heart-shaped opening 331 of the beam actuator 53 from the stationary cross rod 40 to permit the beam actuator to rock on its pivot point 54 unimpeded by the rod 40, as the differential segments 39 rock clockwise to their adjusted positions. The cam slot 37 in the rear end of the key embraces the universal rod 38 of the differential segments 39 at substantially the same time that the beam actuator is operated, to rock the differential segments upwardly a distance corresponding with the value of the key depressed. The differential segments 39, on their clockwise travel, carry the upper end of the beam actuator 53 with them, and the stud 52 of the beam actuator which lies in the heart-shaped cam slot 64 of the minimum movement segment 50 will tend, at some point in its rocking travel, to rock the minimum movement segment 50 with the differential segments 39, providing the digital positions to which the differential segments 39 are to be set, is of higher value than that set up on the previous operation.

In Fig. 2, the minimum movement device 50 is in its zero position, and any clockwise travel of the differential segments 39 will rock the beam actuator 53 and with it the minimum-movement device 50, through the oppositely projecting studs 52.

Since the axes of rotation of the differential segments 39 and the beam actuator 53 are not coincident, the rod 40 might prevent the operation of the machine, were it not for the fact that the narrow apex of the heart-shaped opening 331 in the beam actuator 53 is disconnected from the rod 40 just prior to the rocking of the beam-actuator by the differential segments 39.

The beam actuator 53 continues its upward thrust due to the shapes of the cam slots 62 in the arms 61, coincident with the clockwise rotation of the differential segments 39, the upper rear end of the beam actuator being guided by the cam slot 51 in one of the differential segments 39, and swinging around the rod 40 as it travels rearwardly and upwardly, until the right-hand stud 52 (Fig. 2) in the beam actuator is in the left-hand end of the cam slot 51 in its differential segment 39. During this movement the left-hand stud 52 of the beam actuator cooperates with inner walls of the heart-shaped cam opening 64 in its minimum movement device 50, to rock the minimum movement device, until finally the left-hand stud 52 enters the terminal 65 of the cam opening 64, at the end of its rearward stroke to adjust the minimum movement device 50 to a position determined by the position to which the differential segment 39 has been adjusted by the depression of its key 35.

The cam opening 64, 65 in the "minimum movement" device 50 is so arranged that when the left-hand stud 52 co-operates with the inner wall thereof, the "minimum movement" device is adjusted from its last adjusted position to its new adjusted position through its shortest path, as is well known in the art.

*Indicator*

Figure 7:
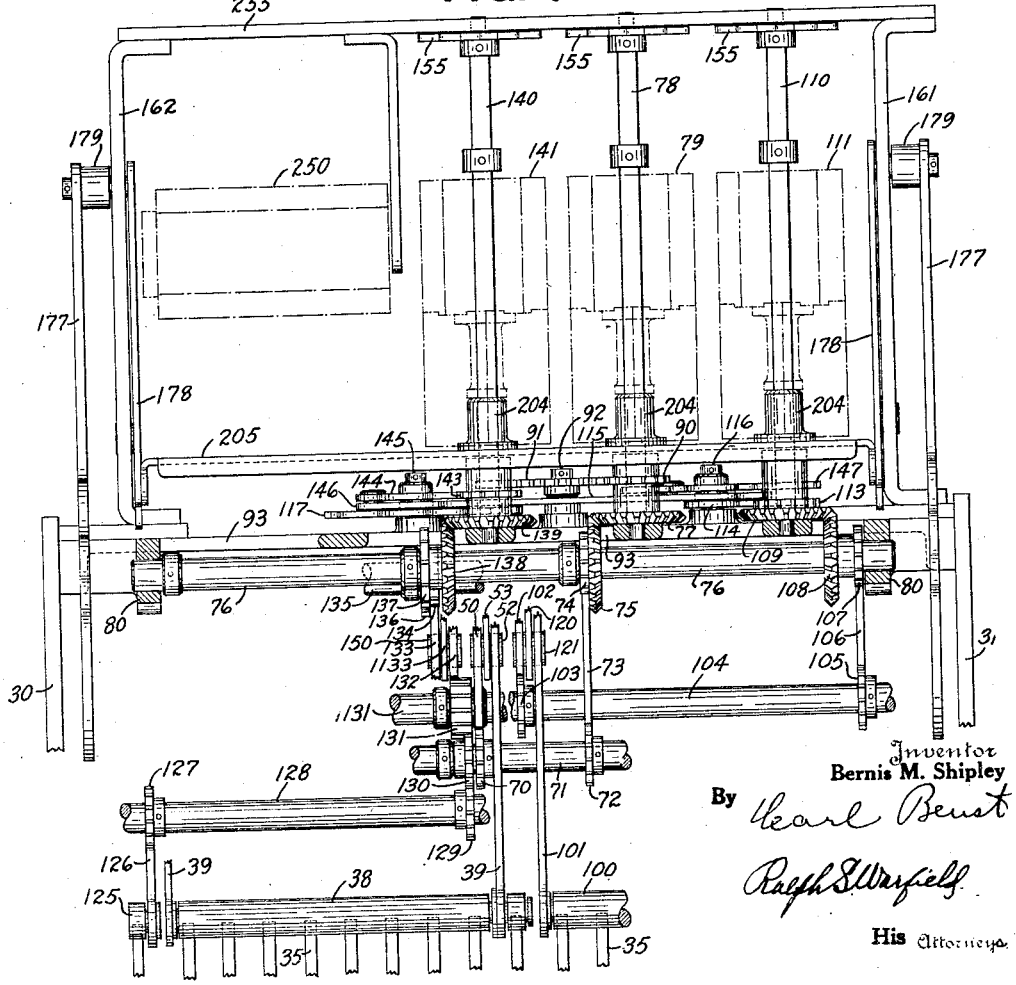
Fig. 7 is a detail front view of the mechanism shown in Fig. 6, and includes the frame work for supporting the indicator mechanism, and diagrammatically, the mechanism for transmitting rotatory movement from the keys to indicators.

The "dimes" indicators are set up by the "minimum movement" device 50. A pinion 70 (Figs. 2 and 7) secured to a transmission shaft 71 meshes with the teeth of the minimum movement device 50, in the dimes bank, the shaft also having secured thereto a companion pinion 72 in mesh with an indicator-driving segment 73, in mesh with a pinion 74. The transmission shaft 71 may be conveniently journaled in the side frames 30 and 31. The pinion 74 is secured to a bevel pinion 75, both of which pinions are mounted to rotate on a rod 76 supported in suitable ears 80 (Fig. 4) depending from the bottom of a bridge piece 93 extending between and secured at its opposite ends to the side frames 30 and 31 (Fig. 7). The bevel pinion 75 meshes with a bevel pinion 77 mounted on the lower end of, and adapted to rotate, a vertical shaft 78, on which the indicator 79 for indicating toward the front of the machine is slidably mounted. The vertical shaft 78 is square and provides a convenient means to rotate the indicator 79 and to permit axial movement thereof on the shaft. The lower end of the indicator shaft 78 is round (Figs. 4 and 7) and is supported in a step bearing formed in the bridge piece 93, the upper end of the shaft being round and similarly journaled in a tie bar 255 secured to indicator side frames 161, 162 extending upwardly from the ends of the bridge piece 93.

It is apparent that any adjustment of the "minimum movement" device 50, as determined by the value of the depressed key 35, is transmitted to the shaft 78 by the pinion 70, shaft 71, pinion 72, indicator-driving segment 73, and pinions 74, 75 and 77, to rotate the "dimes" front indicator 79 to its position of adjustment according to the value of the key depressed.

A companion indicator 89 (Fig. 6) is provided for indicating toward the rear of the machine. This indicator is rotated to position by mechanism connected to the front indicator 79. To this end, a pinion 90 (Fig. 6) is mounted on the vertical shaft 78 and meshes with a segment 91, pivoted on a stud 92, carried by the bridge piece 93 (Figs. 2, 4, 7 and 8). The back indicator 89 is mounted on a vertical shaft 94 similar to the vertical shaft 78, and a pinion 95 being mounted on shaft 94 meshes with the segment 91. Thus any rotating movement imparted to the front indicator 79 is transmitted to the rear indicator 89 by the pinions 90 and 95 and the intermediate segment 91, so that any character which may be set up to be read from the front of the machine, will also be set up to be read from the rear of the machine. Convenient sight openings 96 are provided in a sight plate 97 for exposing the indicators.

The mechanism for transmitting rotary movement to the units of cents indicator will next be described. Each key in the units of cents bank is provided with a cam slot like the cam slots 37 (Fig. 2) for the keys in the dimes bank. The cam slots in the units of cents denominational group of keys differentially rock a universal rod 100 (Fig. 7) similar to the universal rod 38 for the dimes bank, and carried by a pair of differential segments 101 similar to the differential segments 39. For structural reasons, it is desired to have all of the beam actuators and the "minimum movement devices" located substantially in the center of the machine and adjacent each other. Hence the minimum movement device 102 for the units of cents bank of keys 35 is located adjacent the left-hand differential segment 101 for such bank of keys. The left-hand differential segment 101 for the units of cents bank has a cam slot similar to the cam slot 51 of the differential segment 39 (Fig. 2), and a beam actuator 120 (Fig. 7), similar to the beam actuator 53 (Fig. 2) carries oppositely projecting studs 121 (Fig. 7), one of which projects into the cam slot in the differential segment 101, and the other of which projects into the heart-shaped cam opening of the minimum movement device 102. The operation of these parts is exactly the same as that described for the "dimes" bank, and for this reason, no detailed description of the operation of the "cents" minimum movement device 102 will be given. The description for the "cents" bank will be limited to the method of transmitting movement from the minimum movement device 102 to the "cents" indicator.

The minimum movement device 102 (Fig. 7), meshes with a pinion 103 secured to a shaft 104 journaled in any convenient manner on the side frames 30 and 31. Near the right-hand end of the transmission shaft 104 is a pinion 105 in mesh with a segment 106 similar to the segment 73 (Fig. 2) and pivoted on the shaft 40. The segment 106 meshes with a pinion 107 loosely mounted on the shaft 76. Sleeved to the pinion 107 is a bevel pinion 108 in mesh with a bevel pinion 109 mounted on a vertical shaft 110 (Fig. 6) upon which the "cents" front indicator 111 is slidably mounted. Thus, any movement imparted to the "minimum movement" device 102, under control of a "cents" key, is transmitted to the indicator 111 through the pinion 103, transmission shaft 104, pinion 105, segment 106, pinion 107 and bevel pinions 108 and 109.

An indicator 112 (Fig. 6) is provided to indicate the "cents" at the rear of the machine, and is adjusted by connections from the front "cents" indicator shaft 110. A pinion 113 mounted on the vertical indicator shaft 110 (Figs. 6 and 12) meshes with a segment 114 journaled on the bridge piece 93 at 116, and having pivoted thereto one end of a link 115. The opposite end of the link 115 is pivoted to a segment 117 loosely mounted on a stud 145 on the bridge piece 93 and meshing with a pinion 118 mounted on the vertical indicator shaft 119 for the rear cents indicator 112.

Thus any adjustment of the "units of cents" front indicator 111 is transmitted to the "units of cents" rear indicator 112 by the pinion 113, segment 114, link 115, segment 117 and pinion 118.

The machine disclosed herein is provided with only one "dollar" key. For this reason, no universal rod, like the rod 38 (Fig. 2), is required for the "dollar" key. Instead, a stud 125 (Fig. 7) is mounted directly on a differential segment 126, similar to the left-hand differential segment 39 for the "dimes" bank. A pinion 127 meshes with the differential segment 126, the pinion 127 being secured to a suitably journaled shaft 128 having mounted thereon a pinion 129 in mesh with a pinion 130 journaled on the shaft 71. The pinion 130 meshes with a wide pinion 131, loose on a suitably supported shaft 1131, and in mesh with a differential segment 132, like the differential segment 39 (Fig. 2).

A minimum movement device 133, like the device 50 (Fig. 2), is journaled on the rod 40 adjacent the differential segment 132 for the "dollar" key. The differential segment 132 has a cam slot, similar to the cam slot 51 (Fig. 2) for the dimes bank, for controlling the adjustment of a beam actuator 1133, similar to the beam actuator 53 (Fig. 2), the beam actuator 1133 lying between the differential 132 and the minimum movement device 133 and having the oppositely projecting studs 150 entered in the cam slot of the differential and the heart-shaped cam opening in the minimum movement device, respectively.

The method of adjusting the "minimum movement" device 133 is like that described for the adjustment of the "minimum movement" device for the dimes bank.

The "minimum movement" device 133 for the "dollar" bank meshes with a pinion 134 loose on a shaft 135. A pinion 136 secured to the side of the pinion 134 meshes with a pinion 137 loosely mounted on the shaft 76. A bevel pinion 138 sleeved to the pinion 137 meshes with a bevel pinion 139 mounted on the vertical indicator shaft 140. The "dollars" front indicator 141 is slidably mounted on and rotatable with the shaft 140, and therefore, any adjustment imparted to the "minimum movement" device 133 under the control of the depressed "dollar" key, is transmitted to the "dollar" front indicator 141 by the pinions 134, 136, 137, 138 and 139.

Any rotary movement given the indicator shaft 140 (Figs. 6 and 12) is transmitted to a rear "dollars" indicator 142, by the following mechanism. A pinion 143 mounted on the "dollars" shaft 140 meshes with a segment 144 pivotally mounted on the stud 145 projecting from the bridge piece 93. A link 146 pivoted at one end to the segment 144, is connected at its opposite end to a segment 147 pivoted on the stud 116. The segment 147 meshes with a pinion 148 mounted on a vertical shaft 149 which carries the rear "dollar" indicator 142.

Thus, any movement given to the "dollars" front indicator 141, is transmitted to the rear "dollars" indicator 142 by the pinion 143, segment 144, link 146, segment 147 and pinion 148.

For convenience, the indicator shafts are made square. However, it is not intended to limit the invention to a square shaft, inasmuch as any convenient form of shaft may be used. Since it is necessary not only to rotate the indicators to position the proper characters adjacent the sight openings, but it is also necessary to axially shift the indicators relatively to their shafts, a square shaft forms a convenient method of obtaining the results.

The indicators disclosed are preferably formed of two hollow pentagonal members arranged in tandem and offset torsionally. These two parts are formed up of one piece of tubing, swaged to the shape disclosed. The pentagonal parts are torsionally offset so that the angles of one pentagonal member will bisect and overhang the centers of the faces of the other. This construction affords the largest possible sized indicia on the indicator, and occupies a minimum amount of space in the machine. This result is furthered by arranging the indicator characters in two series, upper and lower. However, this arrangement of characters renders it necessary to not only rotate the indicators to position the proper characters opposite the sight openings, but also necessitates shifting the indicators axially on their respective shafts.

The numerals are conveniently arranged so that all of the even numbers are on the upper section or pentagon and the odd numbers are located on the lower section. By arranging the indicia in this manner, the indicators need be rotated only the distance equivalent to one-half of the width of each face of the pentagon, to obtain ten positions of adjustment.

*Indicator aligning mechanism*

Figure 18:
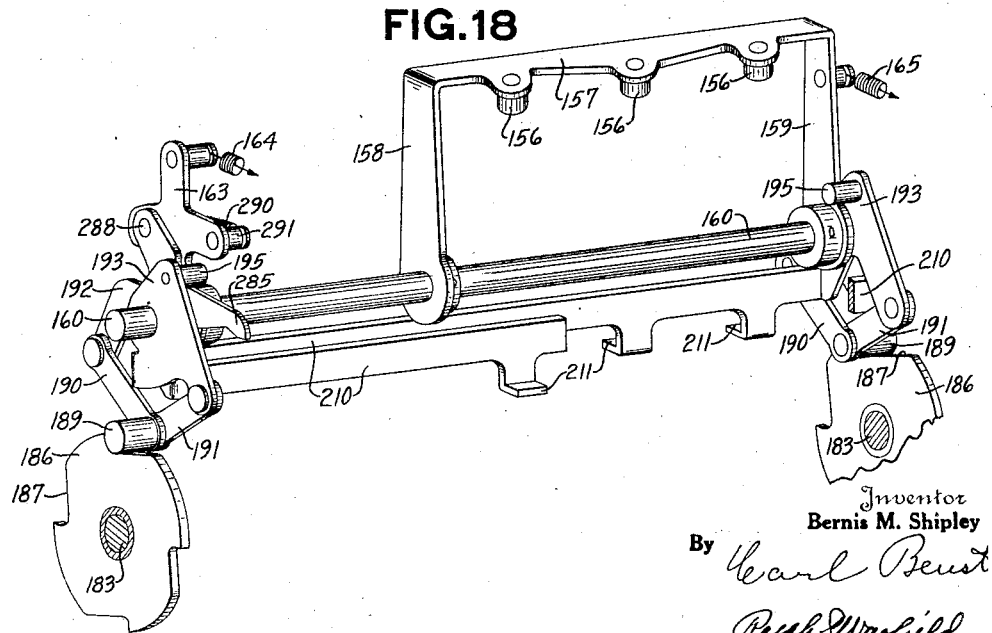
Fig. 18 is a detail perspective view of the indicator aligning and indicator supporting mechanisms.

An aligning mechanism is provided to maintain the indicators in proper alignment and in the positions to which they are rotated by the depression of the keys. To this end, aligning disks 155 are provided near the upper ends of each of the indicator shafts 78, 110 and 140 (Figs. 4 and 9) for one set of indicators, as the front indicators. The disks 155 are each provided with ten notches, one for each of the positions to which the indicators may be set by the depressed keys. Rollers or detents 156 enter the selected notches at each operation of the machine to hold the disks 155 together with the indicator shafts and indicators from rotating after the indicators have been adjusted. The rollers or detents 156 are carried by a bail 157 (Figs. 2, 5, 8, 9 and 18) having arms 158 and 159 secured to a shaft 160 pivotally mounted in the upper indicator side frames 161 and 162 projecting upwardly from opposite ends of the bridge piece 93 and supporting the tie bars 255 for the front and rear series of indicators. An upwardly projecting arm 163 (Figs. 8, 15 and 18) secured to the shaft 160 serves two purposes. One purpose is to provide a convenient means for attaching a spring 164, which, together with a companion spring 165 attached to the arm 159 provides means for maintaining the rollers or detents 156 in contact with the notches in the aligning disks 155.

Before the indicators can be rotated, the rollers or detents 156 must be disengaged from the aligning disks 155. To this end, the mechanism shown in Figs. 4 and 5 has been provided.

Bifurcated arms 170, one secured to each end of the key coupler 57 embrace studs 171 on one arm of bell cranks 172 pivoted on the rod 40. Links 176 connect the remaining arm of each bell crank 172 with arms 174, pivotally mounted on studs 175 carried by the side frames 30 and 31. Vertically disposed links 177 connect the respective arms 174 with the opposite sides of a reciprocatory skeleton frame 178 (Fig. 3) at 179, which frame raises and lowers the indicators in a manner to be later described. The pivotal connections 179 between the links 177 and the sides of the reciprocatory frame 178 extend through vertical guide slots 194 (Fig. 4) in the indicator side frames 161, 162, which slots enforce a rectilinear travel of the reciprocatory skeleton frame or cage. Each link 177 is provided with a slot 180 (Fig. 5) into which projects a stud 181 mounted in a pawl carrying arm 182 pivoted on a stud 183 carried by the auxiliary frames 161 and 162, respectively, one stud 183 being provided for each pawl-carrying arm 182. A spring pressed pawl 184 pivoted on each pawl-carrying arm 182 co-operates with a ratchet disk 185 journaled on each stud 183.

Depression of a key 35 rocks the key coupler 57 upwardly in clockwise direction (Fig. 4) to lift the links 177 and with them the cage 178, the key on its return to normal position enabling the links and cage to descend to their normal positions. As the links 177 rise during the depression of the key, they rock the pawl carriers 182 (Fig. 5)

due to the slot and pin connections 180, 181 therewith to cause the pawls 184 to turn the ratchets 185 one step.

Cam disks 186 (Fig. 18), having equally spaced camming edges 187 are secured to and turn with the ratchets 185. The cam edges 187 operate upon rollers 189 carried at the knuckle joints of toggle links 190 and 191, the opposite ends of which are pivotally connected to the outer ends of a pair of crossed levers 192 and 193 pivoted on the cross shaft 160. The cam disks 186 on opposite sides of the machine, at the beginning of their rotation, raise the rollers 189 to straighten the toggle links 190 and 191 and rock the crossed levers 192 and 193 in opposite directions. The levers 193 are each provided with a stud 195, (Figs. 5, 8 and 18), in the paths of the arm 159 of the aligning bail 157 and the arm 163.

The springs 164 and 165, operating through the arms 163 and 159 respectively constantly tend to rotate the levers 193 in a clockwise direction, thus maintaining the toggle rollers 189 in contact with the cam surfaces 187 of the cam disks 186. When the cam disks 186 commence to rotate as just mentioned, and the rollers 189 are raised, the levers 193, through their studs 195, rock the bail 157 counter-clockwise (Fig. 5) against the tensions of the springs 164 and 165 to disengage the aligning rollers or detents 156 from the aligning disks 155. As the links 177, reach their extreme upward limits of travel, they rotate the cam disks 186 to bring a recess in each disk opposite the toggle joints and rollers 189, whereupon the toggle links 190 and 191 flex or bend, under the tensions of the springs 164 and 165, the toggle rollers 189 dropping into the recesses of the cam disks 186 which have been moved into the paths of the rollers 189 by the links 177 and pawls 184, to permit the springs 164 and 165 to shift the aligning detent rollers 156 back into engagement with the disks 155, as shown in Fig. 9.

Figure 6:
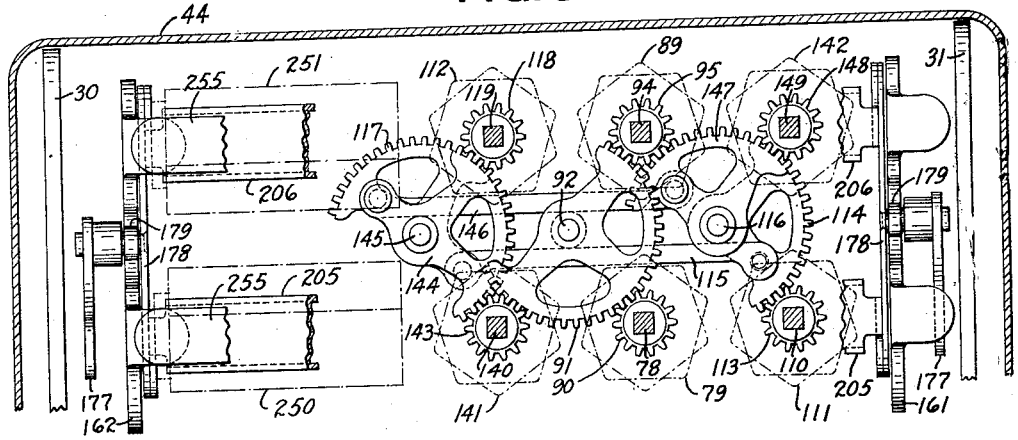
Fig. 6 is a detail top plan view of the mechanism for adjusting the rear indicators according to the adjustment of the front indicators.

No aligning disks 155 or aligning members have been provided for the back indicators, this being unnecessary since the back indicators are directly connected to the front indicators, by the gear and linkage shown in Fig. 6, and therefore, if the front indicators are properly aligned, the back indicators are also properly aligned.

*Indicator shifting mechanism*

The foregoing description has been directed, in the main, to the means for rotating the indicators to position the proper numerals in line with the sight openings, but inasmuch as each indicator is provided with a single consecutive set of numerals arranged in two series on the respective upper and lower pentagonally shaped sections located one above the other, it is necessary to axially shift the indicators to present the proper characters at the sight opening.

In forming these hollow indicators, a piece of tubing of suitable length is shaped to form two pentagonal sections of substantially equal length, the pentagon on one of the sections being formed as though offset torsionally relatively to the other pentagonal section, though there is no actual relative torsional displacement of the sections. In shaping the material to form the indicator shell with offset sections, alternating shoulders are formed at the upper end of the lower section and at the lower end of the upper section, as seen in section in Fig. 4, and in dotted lines in Fig. 6, such shoulders being separated by the thickness of metal only, and as one convenient means for attaching the indicator shells to their vertical shafts, each indicator shell is provided with two five-armed spiders 201 and 203 (Figs. 4 and 19), of proper size to fit inside the shell. These spiders are introduced into the indicator shell at its opposite ends, the outer ends of the arms being angular to fit in the angles and on the shoulders of their respective sections, the two spiders thus lying loosely in the shell, parallel with and closely adjacent each other.

A hub 200 having a square bore to fit and slide upon the indicator shaft, is reduced at its upper end to pass through registering openings formed centrally of the spiders 201 and 203, the upper spider 201 being conveniently staked, or otherwise fastened to the reduced end of the hub, which hub is flanged, as at 202, to support and hold the lower spider 203 in place.

This method securely fastens the hub 200 to the indicator shell in a simple and novel manner.

The hubs 200 carrying the indicators are constructed to loosely fit and slidably move on the indicator shafts. When in lowermost positions, the ends of the indicator hubs 200 for the front and rear series of indicators rest on collars 204 having circular bores encircling the indicator shafts, the collars being mounted on and projecting upwardly from channel bars 205 for the front indicators, and 206 for the rear indicators. (See Figs. 3, 4, 6 and 7). The indicator shafts extend upwardly through the channel bars 205 and 206, which bars are spaced apart and secured at their opposite ends to the sides of the reciprocatory frame 178. As before mentioned, the sides of the reciprocatory frame 178 each have pivoted thereto the links 177 which are raised and lowered by the key coupler 57 and connecting mechanism shown in Fig. 4, at each operation of a key 35.

Operation of the machine rocks the key coupler 57, which, through the bell cranks 172, links 176, arms 174 and links 177, raise and lower the skeleton frame or cage 178, and with it the channel bars 205 and 206, to raise and lower the indicators on their indicator shafts.

Whenever any indicator is rotatably adjusted to bring a flat face of its lower section in parallelism with its sight opening 96 in the sight plate 97, preparatory to displaying the character on such flat face, it is necessary to raise the indicators and support in raised position such of them as have the character or characters desired to be exposed, on their lower sections.

As a matter of convenience and simplicity of construction and operation, it is easier to raise all the indicators at each operation of the machine, retaining in raised position only those indicators on which the desired character for display is on the lower section, the remaining indicators restoring to their lower positions, to expose the characters on their upper sections.

The angles or corners on the lower section of each indicator, readily lend themselves to the purpose of maintaining the indicators in their raised positions when necessary to expose the lower characters through the sight openings.

Cooperating with the corners or angles of the lower sections of the respective series of indicators are two supporting bars 210 (Figs. 5, 8 and 18) having lateral flanges or lips 211 projecting into the paths of the corners or angles of the respective indicators. At the beginning of the operation of the machine when the elevating links 177 are raised, and the cam disks 186 (Fig. 5) raise the toggle rollers 189 to straighten the toggle links 190 and 191, the flanges 211 are withdrawn from contact with the indicators when the indicators are in raised positions. The bars 210 extend between and are carried by the arms of levers 192, 192 and 193, 193, that is, each bar connects the corresponding levers of each pair. When the elevating links 177 rise to rotate the cam disks 186 and rock the levers 192 and 193, to withdraw the indicator aligning rollers or detents 156, as heretofore described, the supporting bars 210 rock with their levers 192 and 193, respectively, to withdraw the flanges or lips 211 from cooperation with the indicators, and any indicators which may have been supported by the flanges, will partially return to their normal positions at this time.

The levers 192 and 193 withdraw the supporting bars 210 and their flanges 211 at the beginning of the operation of the machine before the indicators are rotated in the manner heretofore described. After the indicators have been raised to their uppermost positions and rotated to their selected positions, the supporting bars carrying the flanges 211 are rocked back into cooperative relation with the indicators. This occurs when the toggle joint rollers 189 drop into the recesses of the cam disks 186, as heretofore described, at the time when the aligner rollers or detents 156 rock into contact with the aligning disks 155. When the lowermost section or pentagon of the indicator presents a flat surface to the sight opening, the rear of the indicator presents an angle or corner overhanging one of the flanges 211, and therefore, when the reciprocatory lifting frame 178 is lowered to withdraw the channel bars 205 and 206 from the elevated indicators, the overhanging angles or corners of those lower pentagonal sections of the indicators which present their flat faces to the sight openings 96, catch on the flanges 211, which maintain those indicators in raised positions to expose the characters on the lower pentagonal sections of the indicators through the sight openings.

If one or more of the indicators are adjusted to present a flat surface of the upper pentagonal section of the indicator to the sight opening, then one of the flat faces on the lower pentagonal section is opposed to the flange 211, and since the flange 211 is not long enough to engage the indicator when a face is presented thereto, the indicator will drop as the channel bars 205 and 206 are lowered, and present a character of the upper pentagonal section of the indicator to the sight opening.

Though the indicator disclosed in the present application is formed of two pentagonal sections, it is to be understood that the invention is not limited to such a specific form, inasmuch as any suitable polyhedral member can be used equally well with the mechanism disclosed. If, for example, fourteen characters are to be indicated by means of a single indicator, then two seven-sided sections can be used and each of the sections of the indicator and the angles or corners of the lower torsionally offset section can cooperate with the holding means in exactly the same manner as the pentagonal-shaped member disclosed.

The mechainsm for imparting rotary movement to the indicators for selecting the character to be exposed operates substantially simultaneously with the indicator lifting or elevating mechanism, but it is not desired to limit the invention to this simultaneous operation of the mechanisms, inasmuch as means may be provided for first rotating, and then shifting the indicators, or for first shifting the indicators and then rotating them. However, it is more convenient to have these two mechanisms operate substantially simultaneously since it effects a saving of time in the operation of the machine. This saving of time is especially important in press-down key machines where all the mechanisms are operated by depression and return of the keys.

"Cash" and "No Sale" indication

A special indicator is provided for designating the instant transaction. Such indicator may bear the word "Cash" or the words "No Sale", for example. In the present form, the special indicator mechanism is arranged to normally present the word "Cash" to the sight opening when the "No Sale" key is not depressed. To indicate the words "No Sale", it is necessary to press the "No Sale" key which positively adjusts the indicator to the "No Sale" position, whereupon the indicator is locked where adjusted. If the next operation is a "Cash" entry, the indicator automatically releases, and a spring returns the indicator to normal position to exhibit the word "Cash" at the sight opening.

There are two special indicators, the front indicator 250 (Figs. 13 and 15), and the rear indicator 251, each bearing the words "Cash" and "No Sale". The indicator 250 is provided with a pinion 252 secured to a horizontal shaft 253 to which the indicator 250 is also secured. The horizontal shaft 253 is journaled in the indicator side frame 162 and a hanger 254 depending from the cross bar 255 supported by the indicator side frames 161 and 162. The indicator 251 for indicating the transactions toward the rear of the machine is supported by a similar horizontal shaft 257 journaled in the indicator side frame 162 and the hanger 254, and provided with a pinion 256. A double-ended segment 258 pivoted on a stud 259 carried by the indicator side frame 162 meshes with both pinions 252 and 256. A control arm 262 is fast with the double-ended segment 258, and one end of a spring 260 is connected thereto, to normally rotate the double-ended segment 258 in a counter-clockwise direction until arrested by a fixed stop 268, at which time the word "Cash" will be displayed. The upper end of the spring 260 is connected to a stud 261 carried by the indicator side frame 162.

When the control arm 262 is in normal position, a roller 265 on the lower extremity of the control arm lies adjacent an upwardly extending finger 266 of a forked pitman 267. Thus, with the pitman 267 in its normal position, as shown in Fig. 13, the spring 260 holds roller 265 in contact with the upper extension 266 of the pitman.

A "No Sale" key 270 operates the pitman 267, the movement of which is guided by a slot 269 and a suitable pin. The "No Sale" key is pivoted on the same rod 36 on which the amount keys 35 are pivoted.

Depression of the "No Sale" key 270 lifts the pitman 267 to bring a cam surface 271 on the finger 266 into contact with the roller 265 on the control arm to rock the control arm 262 and its double segment 258 in counter-clockwise direction, (Fig. 13), to turn the special indicators 250 and 251 to present the words "No Sale" to the sight openings.

Since the double segment 258 is normally spring-actuated in clockwise direction, it is necessary to provide a latch to maintain the indicators 250 and 251 in their "No Sale" positions, so that, upon release of the "No Sale" key 270, the double-ended segment 258, and the special indicators will be retained where adjusted. This is necessary because it is desirable to maintain the words "No Sale" at the sight openings after the machine comes to rest and until the beginning of the next operation of the machine.

To accomplish this, one arm of a latch 285 (Fig. 15) pivoted on the shaft 160 engages a notch 286 in a disk 287 secured on and turning with the front indicator shaft 253. The latch 285 is formed like a bell crank, the upper arm of which carries a stud 288 projecting through a slot 289 in the before mentioned spring-actuated indicator detent-controlling arm 163. A spring 290, stretched between the stud 288 and a stud 291 on the arm 163, normally tends to hold the latch 285 in engagement with a notch 292 in the disk 287.

The before mentioned restraining stud 195 (Figs. 8 and 15), carried by the lever 193 and extending across the indicator detent bail operating arm 163, also lies in the path of the latch 285. Since the stud 288 on the latch 285 projects into the slot of the arm 163, and is held in position by the spring 290 also connected to the arm 163, it is apparent that when the machine is operated and the lever 193 is rocked counter-clockwise (Fig. 15), the stud 195 rotates, not only the arm 163, but also the latch 285 in counter-clockwise direction to withdraw the nose of the latch 285 from a notch 292 of the disk 287 in which the latch normally engages to maintain the indicator in the "Cash" position.

Upon depression of the "No Sale" key 270, the cam edge 271 on the finger 266 of the pitman 267 rocks the double-ended segment 258 to turn the indicators 250 and 251 in clockwise direction (Fig. 15) until the notch 286 of the locking disk 287 is positioned in the path of the latch 285. At the end of the down stroke of the "No Sale" key, the arm 163 and latch 285 are released, as above described, and then the latch 285 drops into the notch 286 to maintain the indicators in position to expose the words "No Sale". However, upon the next operation of the machine, when the cam disk 186 rotates in the manner heretofore described, to rock the lever 193 in counter-clockwise direction, to swing the arm 163, the arm 163 will rock the latch 295 in counter-clockwise direction, and release the special indicators to the action of the restoring spring 260 (Fig. 13). The restoring spring 260 rotates the double-ended segment 258 in clockwise direction (Fig. 13) until the segment is arrested by the stud 268 in the side frame. When in this position, the special indicators position the word "Cash"

at the sight openings, and the latch 285 engages the notch 292 as shown in Fig. 15.

From the above it will be apparent that the spring 260 always returns the special indicators to expose the word "Cash", whereas the cam edge 271 on the pitman 267 positively moves the special indicators to the "No Sale" position, as determined by the "No Sale" key 270.

Operation

In using the machine, the items are entered by depressing the appropriate amount keys 35 (Fig. 1) which adjust the differential mechanisms to rotate the indicators to select the proper characters, and, also lifts the indicators to determine which of the two sets of characters thereon are to be exposed at the sight openings.

Depression of a key 35, through the differential slot 37 in the rear end thereof, adjusts the differential segment 39 according to the value of the key depressed, and the "minimum movement" actuator 53 operates to adjust the "minimum movement" device 50 accordingly. The minimum movement device rotates the corresponding front and rear indicators to position the characters to be exposed in line with the sight openings, the indicators moving directly from their last adjusted position to the new position. Substantially simultaneously with the rotation of the indicators to select the characters for indication, the indicators are raised to determine whether or not the upper or the lower characters are to be exposed at the sight openings. By the time the indicators are elevated to their uppermost positions, the differential rotation of the indicators is completed, and the indicator elevating frame 178 returns to its normal lowest position as the depressed key restores. Also, the means 210, 211 which supports the indicators in elevated positions becomes effective. If characters on the lower sections of the indicators are to be exposed in the sight openings, the indicators will settle down until the angles of the indicators diametrically opposite the flat faces bearing the characters to be displayed, rest on the supporting members 210, 211, which will hold the indicators in their elevated positions. However, if one of the characters on the upper section of the indicators has been brought parallel with the sight opening 96 to be exposed, the lower sections of those same indicators present flat faces to the supporting means 210, 211, so that as the elevating frame 178 descends with the return of the depressed key, the indicators descend therewith, escaping past the supporting means 210, 211 and positioning the selected characters on the upper sections of the indicators opposite the sight openings.

The aligning device 157, 158 moves into position to maintain the indicators against displacement after they have been differentially adjusted and positioned according to the value of the depressed key.

Special indicators 250, 251 having the words "Cash" and "No Sale" indicate whether a "cash" transaction or a "no sale" transaction is effected. These indicators normally indicate the word "Cash" in the sight openings and are held there by a spring 260. When the "No Sale" key is depressed, the indicators are positively adjusted to the "No Sale" positions and latched in adjusted positions. Upon the next operation of the machine, the latch is released to permit the spring to return the indicators to expose the word "Cash" at the sight openings, providing the "No Sale" key has not been depressed.

This machine has been specially arranged for unit assembly, the indicator mechanism and the differential mechanism, being independently assembled as units, and subsequently assembled together in the machine.

Obviously, this invention will include an arrangement of indicators having the rows of characters arranged side by side, the indicators being shiftable horizontally to expose a character in one row or the other.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed as new is:

1. In an indicating mechanism, the combination of an indicator body having a plurality of plane faces arranged in a plurality of series; means to rotate the indicator body to select for display a character on one of the plane faces; and separate means to shift the indicator to expose the selected character.

2. In an indicating mechanism, the combination of an indicator having a plurality of series of peripherally arranged characters the series being in different planes; means to turn the indicator to select a character from one of the series; and separate means to shift the indicator bodily to determine the series from which the character is selected, and to expose the selected character.

3. In an indicating mechanism, the combination of an indicator bearing characters arranged around its periphery in a plurality of adjacent parallel planes; a differentially operable device to rotate the indicator to select a character on one of the planes for display; and a device to shift the indicator in a direction at right angles to the direction of rotation of the indicator to expose the selected character.

4. In an indicating mechanism having a sight opening, the combination of an indicator bearing a single full complement of characters arranged in a plurality of series placed in horizontal planes; differentially operable means to rotate the indicator to select any character desired in any of the series; separate means to bodily shift the indicator relatively to the sight opening; and other means, effective only in case a character from a certain one of the series has been selected, to latch the indicator in shifted position.

5. In an indicating mechanism, the combination of an indicator bearing characters arranged peripherally thereof, and in a plurality of planes, means to rotate the indicator to select a character from one of the planes; means to shift the indicator to expose the selected character, and a device to selectively maintain the indicator in its shifted position to hold certain characters in exposed position when selected.

6. In an indicating mechanism, the combination of an indicator bearing characters arranged peripherally thereof, and in a plurality of planes; means to rotate the indicator to select a character from one of the planes; means to shift the indicator to expose the selected character; and automatic means cooperating with the indicator to maintain the indicator in its shifted position when certain characters are exposed.

7. In an indicator mechanism; the combination of an indicator having a plurality of polyhedral sections formed of one piece of material, and circumferentially offset to locate the angles of one polyhedral section in line with the centers of the faces of the other polyhedral section; means to rotate the indicator to select one of the faces thereon for display; means to raise and lower the indicator; and a device shiftable into and out of the path of the angles of one polyhedral section, to maintain the indicator elevated when the indicator has been rotated to position any of the faces of one section for display.

8. In an indicator mechanism; the combination of an indicator having a plurality of polyhedral sections, circumferentially offset; means to rotate the indicator to select one of the faces thereon for display; means to raise and lower the indicator; and a device shiftable into the path of the indicator subsequently to the elevation of the indicator to determine which section is to be displayed.

9. In an indicator mechanism; the combination of an indicator formed of a plurality of polyhedral sections, arranged in tandem and circumferentially offset to bring the angles of one section in line with the faces of the other section; means to rotate the indicator to adjust a single face of one of the sections for display; means to raise and lower the indicator to bring the lower section into view; and means shiftable beneath one of the angles on the selected indicator to support the indicator in raised position.

10. In an indicator mechanism, the combination of an indicator having a plurality of polyhedral sections, circumferentially offset, the meeting edges of the faces on each section forming angles; means to rotate the indicator to select any face of any of the plurality of polyhedral sections for display to the exclusion of the remaining faces; means to raise and lower the indicator to bring the lower section into view; means having a limited shift into and out of position beneath an angle on the lower section to support the indicator in raised position to expose a selected face thereon, the faces on the lower section adapted to escape the supporting means as they descend to expose a selected face on the upper section, said supporting means being arranged to clear the faces of the lower section when a face on the upper section is selected for display, to permit the descent of the indicator.

11. In an indicator mechanism; the combination of an indicator bearing a full system of digits arranged in two lines thereon, one line comprising all the even digits and the other all the odd digits; means to rotate the indicator to select either an even or an odd digit; means to shift the indicator bodily to display the selected digit; and means to hold the indicator in its shifted position only when a digit of a predetermined kind is selected for display.

12. In an indicator mechanism; the combination of a single indicator bearing a full system of digits arranged in two lines thereon, one line having all the even digits, and the other all the odd digits; means to rotate the indicator to bring either an even or an odd numeral into position to be shifted relatively to a sight opening; means to shift the indicator bodily; and means engaged by the indicator to support it in its shifted position when any one of the digits of one of the lines of digits is selected for display.

13. In an indicating mechanism; the combination of an indicator having a plurality of polyhedral sections arranged in tandem, the meeting edges of the faces on which sections form angles; adjusting means therefor to select a face of one of the sections; and means cooperating with an angle of one of the polyhedral sections to maintain the indicator in adjusted position.

14. In an indicating mechanism, the combination of an indicator having a plurality of polyhedral sections arranged in line and circumferentially offset, the angles of one section extending in line with the faces of the adjacent section; a series of characters on each polygon, each face bearing a different character; means to rotate the indicator to select a character; means to axially shift the indicator; and means co-operating with the angles of one section to maintain the indicator in its position of axial adjustment.

15. In an indicator mechanism; the combination of an indicator having a plurality of sections, each of which sections bears a series of characters thereon; means to differentially rotate the indicator; means to axially shift the indicator a fixed distance to displace the characters of one series relatively to a sight opening and locate a character of the other series adjacent the sight opening; a device to retain the indicator in the position to which it has been shifted; and means operable at each operation of the machine to release the retaining device to enable the indicator to return to its original position when another series of characters has been selected.

16. In an indicator mechanism, the combination of an indicator bearing a plurality of series of characters arranged in parallel rows circumferentially thereof; means to differentially rotate the indicator to select a character thereon for display; means to raise and lower the indicator; means shiftable into the return path of the indicator subsequently to the elevation of the indicator, to support the indicator in its elevated position, the indicator so formed that its relation to the shiftable supporting means varies depending upon the series in which the selected character is located, to enable the supporting means to become effective when any character in one series is selected and to be ineffective when any character in another series is selected.

17. In a machine of the class described, having a sight opening therein; the combination of an indicator having two series of plane faces arranged peripherally thereof in tandem; means to turn the indicator to bring one or another plane face parallel with the sight opening; means to elevate the indicator to expose the characters of one series; and means to support the indicator in elevated position.

18. In an indicating mechanism, the combination of an indicator bearing two series of characters arranged peripherally thereof, and in a plurality of adjacent parallel planes, means to rotate the indicator to select a desired character from any plane for display; and means to shift the indicator to expose the selected character on any plane.

19. In an indicator mechanism, the combination of an indicator having a plurality of sections arranged end to end; shoulders formed at the juncture of the sections; spiders seated against opposite sides of the shoulders; the spiders having registering apertures; a hub enclosed within one of the sections, the hub having a tenon extending through the apertures of the spiders and fastened to the farthermost spider; and an enlargement on the hub in contact with the innermost spider.

20. In an indicator mechanism, the combination of an indicator having a plurality of sections arranged end to end; shoulders formed at the juncture of the sections; spiders seated against opposite sides of the shoulders; the spiders having registering apertures; a connecting member extending through the apertures in the spiders and secured to the outermost spider; and means on the connecting member in contact with the innermost spider.

21. In an indicator mechanism, a hollow indicator body composed of a shell formed of a plurality of integral polyhedral circumferentially offset sections.

22. In an indicator mechanism, the combination of a hollow indicator body having a plurality of integral polyhedral sections circumferentially offset relatively, to form shoulders at the abutting ends of the sections; spiders loosely seated against opposite sides of the shoulders; and a connection between the spiders.

23. In an indicator mechanism, the combination of an indicator body having a plurality of sections arranged in line and shouldered at their abutting ends; spiders seated against the shoulders of the respective sections; and a connection between the spiders.

24. In an indicator mechanism, the combination of an indicator body having a plurality of sections arranged in line and shouldered at their abutting ends; spiders seated against the shoulders of the respective sections; a hub to connect the spiders, and a support on which the hub is slidable.

25. In an indicator mechanism, the combination of an indicator body having a plurality of sections arranged in line and shouldered at their abutting ends; spiders seated against the shoulders of the respective sections; and a flanged connecting member having a tenon extending through the spiders and secured to the outermost spider.

26. In an indicator mechanism, the combination of an indicator body having a plurality of sections arranged in line and shouldered at their abutting ends; spiders seated against the shoulders of the respective sections; and a flanged hub, one end of which extends through the spiders until the innermost spider rests against the shoulder, the hub being fastened to the outermost spider.

27. In a machine of the class described, the combination with a suitable support; keys pivotally mounted on the support; and a key coupler operable by the keys; of a plurality of indicators; rotatable shafts, the indicators adapted to turn with and slide along these shafts; means operable by the key coupler to shift the indicators axially of the shafts; and means to differentially rotate the indicators.

28. In an indicator mechanism; the combination with rotatable shafts and means to differentially adjust the shafts; of indicators, each having a plurality of sections arranged in line, and slidably mounted on the shafts; and means to shift the indicators relatively to a series of sight openings normally opposite one line of sections.

29. In an indicator mechanism; the combination with rotatable shafts and means to differentially adjust the shafts; of indicators, each having a plurality of sections arranged in line, and slidably mounted on the shafts; a cage to shift the indicators relatively to a series of sight openings normally opposite one line of sections; and means to shift the cage.

30. In an indicator mechanism; the combination with rotatable shafts and means to differentially adjust the shafts; of indicators, each having a plurality of sections arranged in line, and slidably mounted on the shafts; a cage to shift the indicators relatively to a series of sight openings normally opposite one line of sections; means to shift the cage; and means to detain the indicators in shifted position while the cage returns to its normal position.

31. In an indicator mechanism; the combination with rotatable shafts and means to differentially adjust the shafts; of indicators, each having a plurality of sections arranged in line, and slidably mounted on the shafts; means to shift the indicators relatively to a series of sight openings normally opposite one line of sections; and means depending for its effectiveness on the different positions of the indicators, to detain the indicators in shifted position.

32. In a machine of the class described, the combination of a rotatable shaft; an indicator slidably arranged on an axis common with the shaft and rotatable therewith; manipulative means to differentially rotate the shaft; and means actuated by the manipulative means to shift the indicator on said axis and relatively to the shaft when the indicator is in any of its differential positions.

33. In a machine of the class described, the combination of a vertically extending rotatable shaft; an indicator slidably mounted on the shaft, and rotatable therewith; manipulative means to differentially rotate the shaft; a cage slidably mounted on the shaft to raise and lower the indicator; and means actuated by the manipulative means to operate the cage.

34. In a machine of the class described, the combination of a shaft; an indicator arranged to shift on the shaft; means to differentially rotate the indicator; a cage to support the indicator, said cage being slidable relatively to the shaft; means to guide the cage in its travel; and means to shift the cage from and to its normal position to shift the indicator.

35. In a machine of the class described, the combination with an indicator bearing a plurality of indicia; means to differentially rotate the indicator to select an indice; and a key-operated member; of means to shift the indicator axially, including a cage; means to guide the cage; and a linkage to connect the cage with the key-operated member.

36. In a machine of the class described, the combination with a suitable support; of a plurality of shafts arranged in parallel series on the support; a cage including sides arranged at the opposite ends of the series, and tie bars extending between and connecting the sides; guide means for the cage; indicators slidably mounted on the shafts; means to differentially rotate the indicators; and means to shift the cage, the tie bars of which coact with the indicators to shift the latter.

37. In a machine of the class described, the combination with a rotatable indicator; and manipulative means to determine the degree of rotation to be imparted to the indicator; of minimum movement mechanism between the manipulative means and the indicator, including a differential member actuated by the manipulative means, the member having a guide slot formed therein; a minimum movement rack segment having a centering slot and connected with the indicator; and an actuator having projecting members, one member being entered in the guiding slot in the differential member and another member being entered in the centering slot in the minimum movement segment to actuate the latter in accordance with the adjustment of the differential member.

38. In a machine of the class described, the combination with a rotatable indicator; manipulative means to determine the degree of rotation to be imparted to the indicator; a differential member; and a key operated member; of minimum movement mechanism between the differential member and the indicator, including a minimum movement device having a centering opening therein; and an actuator between the differential member and the minimum movement mechanism driven by the key-operated member and having a loose connection with the differential member, and a centering projection entered in the centering opening of the minimum movement device to actuate the latter in accordance with the adjustment of the differential member.

39. The combination with a rotatable indicator; a differential member; and means, including the ends of keys and means rigid with the differential member to determine the degree of differential travel to be imparted to the differential member; of a minimum movement device connected with the indicator, and having a centering opening formed therein; an actuator for the minimum movement device, having a loose connection with the differential member, and a projection entered in the centering opening of the minimum movement device to adjust the latter according to the adjustment of the differential member; and means, including a key-operated device to drive the actuator and restore the differential member.

40. The combination with depressible keys; a rotatable indicator; a differential member; and means including cam slots in the keys, to determine the degree of differential travel to be imparted to the differential member; of a minimum movement device connected with the indicator, and having a centering opening formed therein terminating in a seat; an actuator for the minimum movement device, connected with the differential member for relative movement, and having a projection entered in the centering opening of the minimum movement device; means operable upon depression and return of said keys to advance and withdraw the actuator relatively to the terminal seat in the centering slot of the minimum movement device, to adjust the latter according to the adjustment of the differential member, said last-mentioned means operable to restore the differential upon the return of said keys.

41. An indicating mechanism for cash registers comprising a plurality of non-axially aligned parallel rows of vertical indicator shafts; denominational indicators mounted on the shafts for front and back indication; means to rotate the shafts and indicators of one row; and sectors and links to connect the indicator shafts of corresponding denomination in the two rows of front and rear indicators to enable the indicators of one row to correspondingly rotate the indicators of the other row.

42. In an indicating mechanism for key-operated machines, the combination with an indicator bearing a plurality of indicia; and means to differentially rotate the indicator relatively to a sight opening to select an indice; of means to shift the indicator axially relatively to the sight opening; means to retain the indicator in its shifted position while the shifting means returns to home position; and means actuated at each operation of a key to trip the retaining means and free the indicator for return to home position.

43. In a machine of the class described, the combination of an indicating mechanism, including a plurality of rows of indicators; means to differentially rotate the indicators relatively to a series of front and a series of rear sight openings, respectively; means common to the rows of indicators to shift the indicators axially relatively to their corresponding sight openings; a retaining member for each row of indicators to hold the indicators in their shifted positions; crossed levers supporting the retaining members; a toggle lever to connect the crossed levers; and a cam to actuate the toggle lever at each operation of the machine to trip the retaining members and free the indicators.

44. In a key-operated machine of the class described, the combination of an indicator; means to differentially rotate the indicator relatively to a sight opening; means to shift the indicator axially relatively to the sight opening; means to retain the indicator in its axially shifted position; a normally effective aligning means to hold the indicator against accidental rotation; and means common to the retaining and the aligning means to control the effectiveness of both said means.

45. In a key-operated machine of the class described, the combination of an indicator; means to differentially rotate the indicator relatively to a sight opening; means to shift the indicator axially relatively to the sight opening; means to retain the indicator in its axially shifted position; a normally effective aligning means to hold the indicator against accidental rotation; an intermittently operated cam; and a lever operated by the cam and common to the retaining and the aligning means to control the effectiveness of both said means.

In testimony whereof I affix my signature.
BERNIS M. SHIPLEY.